G. WENDLER.
SHAFT COUPLING.
APPLICATION FILED APR. 18, 1916.
1,281,448.
Patented Oct. 15, 1918.
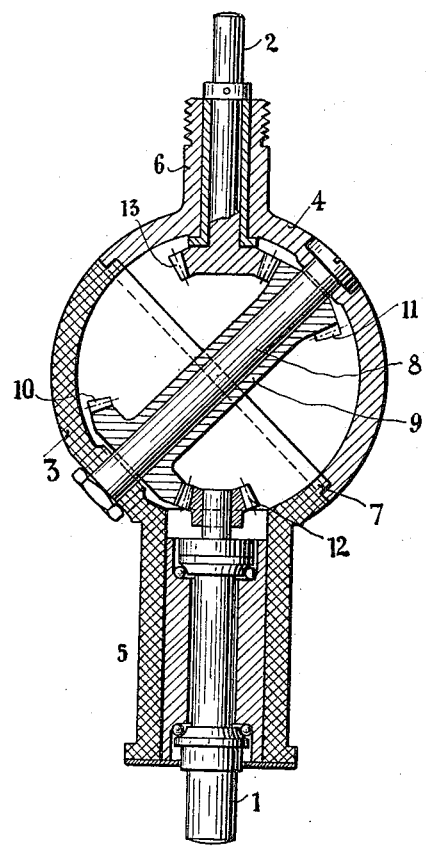

UNITED STATES PATENT OFFICE.

GEORG WENDLER, OF BERNE, SWITZERLAND, ASSIGNOR TO HASLER A. G. VORMALS TELEGRAPHENWERKSTÄTTE VON G. HASLER, OF BERNE, SWITZERLAND, A CORPORATION OF SWITZERLAND.

SHAFT-COUPLING.

1,281,448.   Specification of Letters Patent.   Patented Oct. 15, 1918.

Application filed April 18, 1916.   Serial No. 91,843.

*To all whom it may concern:*

Be it known that I, GEORG WENDLER, a citizen of the Swiss Confederation, and residing at Berne, Switzerland, have invented certain new and useful Improvements in Shaft-Couplings, of which the following is a specification.

This invention relates to devices for coupling shafts at various angles.

If two shafts located at a known angle are to be coupled together it is customary to use two bevel gears whose angles correspond with the angle of the two shafts to be connected. In this kind of transmission the speed of rotation of the one shaft relatively to the other can be varied by suitably selecting the number of teeth of the two bevel gears. The gear wheels can be readily protected by a closed box. Such a coupling has the great disadvantage that it can be used only for the known angle for which the gear wheels have been specially cut.

If the angle of the two shafts to be connected is not known or, in other words, if the coupling shall be used for any desired angle, a universal joint or a Cardan joint, also known as Hooke's joint is employed. The universal joint has the disadvantage, however, that the motion of the one shaft is transmitted non-uniformly to the other. If the driving shaft rotates at a uniform speed the speed of the driven shaft will vary during one revolution and its non-uniformity will be greater, the smaller the angle of the two shafts. In addition, it is very difficult to protect such a joint sufficiently from dust and injury. In this type of coupling the ratio of transmission is invariable and is 1:1.

A primary object of my invention is to provide an improved shaft coupling in which the advantages of the above mentioned two types of couplings are united, while their disadvantages are obviated.

To this end, according to my invention the shafts to be coupled together are positively connected with one another by means of a counter-shaft connecting two bevel gears, about which one of the said shafts can be turned, so that with one and the same coupling uniform rotary motion can be transmitted without varying the uniformity to shafts located at various angles.

To these ends, the invention consists in the construction, arrangement and combination of parts described hereinafter and pointed out in the claims.

One embodiment of the invention is represented by way of example in longitudinal section in the accompanying drawing.

The coupled ends of two shafts 1 and 2 which, for the sake of simplicity, are represented in a coaxial position, are located one in each half of a two-part hollow ball 3, 4. The shaft 1 is journaled in a tubular projection 5 of the half 3 and the shaft 2 in a tubular projection 6 of the half 4. The plane of separation of the two halves is located at 45° to the axis of the two shafts 1 and 2. Each of the hemispheres has a rim 7, which takes into a rabbet in the other, so that they are rotatable about the axle 8 which is located at right-angles to the said plane of separation and is arranged centrally in the same. This axle 8 holds the two hemispheres together and carries a loose hollow shaft 9, the two ends of which constitute bevel wheels 10 and 11. The bevel wheel 10 meshes with a bevel wheel 12 fast on the shaft 1, while the bevel wheel 11 meshes with a bevel wheel 13 fast on the shaft 2.

By turning the half 4 about the axle 8 the shaft 2 can be moved into any desired position between 90° and 180° within the spherical area described by it relatively to the shaft 1, the uniformity of the transmission of motion being in no way impaired.

By selecting suitable bevel wheels the ratio of transmission of the two coupled shafts can be obtained as desired within limits determined by the size of the coupling. The hollow sphere has the advantage that the gearing is completely protected from dust and other external influences. The hollow ball may contain a suitable lubricant, so that the gearing runs wholly or partially in oil or grease for example.

I claim:—

1. An adjustable shaft coupling comprising in combination with the two shafts to be coupled, a gear wheel carried by each shaft, a rotatable intermediate counter-shaft, a bevel gear at the ends of said counter-shaft in mesh with the gear wheel on the said two shafts to be coupled, a two-part hollow casing inclosing said counter-shaft and being formed with bearings for the two shafts to be coupled, the said counter-shaft being mounted in the said casing at an angle of 45° relative to each of the said two shafts, the two halves of the said casing being capable of relative displacement, the plane of separation of the two halves being at right angles relative to said counter-shaft and at an angle of 45° relative to the said two shafts to be coupled.

2. An adjustable shaft coupling, as specified in claim 1, in which the hollow casing is spherical and the two halves are held together by an axle, the hollow counter-shaft being rotatably mounted on said axle.

3. An adjustable shaft coupling, as specified in either claim 1 or 2, in which the two halves of the hollow casing are provided each with a tubular projection forming a bearing for the two shafts to be coupled.

4. An adjustable shaft coupling, as specified in either of claims 1, 2 or 3, in which the two halves of the hollow casing are provided with a rabbet and a projecting rim adapted to engage said rabbet, the two halves thus forming a liquid-tight hollow casing adapted to contain a lubricating medium.

In testimony whereof, I affix my signature in the presence of two witnesses.

GEORG WENDLER.

Witnesses:
    FRIEDRICH NAEZEIR,
    FRIEDRICH MONING.

Copies of this patent may be obtained for five cents each, by addressing the "Commissioner of Patents, Washington, D. C."